(12) United States Patent
Wegner et al.

(10) Patent No.: US 6,882,651 B1
(45) Date of Patent: Apr. 19, 2005

(54) FLOW CONTROL OF DATA UNITS ACROSS A BUS BRIDGE AND INTER-BUS COMMUNICATION SYSTEM EMPLOYING SAME

(75) Inventors: Norbert Wegner, Winnipeg (CA); Peter Arkadjevich Bliznyuk-Kvitko, Winnipeg (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/203,375

(22) Filed: Dec. 2, 1998

(51) Int. Cl.[7] .............................................. H04L 12/56
(52) U.S. Cl. ...................................... 370/401; 370/402
(58) Field of Search ................................. 370/229, 235, 370/252, 285, 287, 290, 299, 264, 265, 373, 377, 386, 395.72, 428, 401, 402, 257, 362, 364, 230, 315, 40.1, 492, 501, 221, 222, 217, 218; 710/107, 108, 112, 306, 311, 312, 126

(56) References Cited

U.S. PATENT DOCUMENTS

| | | | | |
|---|---|---|---|---|
| 5,367,534 A | * | 11/1994 | Chou et al. ................. | 375/222 |
| 5,560,022 A | * | 9/1996 | Dunstan et al. ............. | 395/750 |
| 5,721,839 A | | 2/1998 | Callison et al. ............. | 395/308 |
| 5,953,538 A | * | 9/1999 | Duncan et al. ............... | 710/22 |
| 5,958,032 A | * | 9/1999 | Manabe ....................... | 710/310 |
| 6,026,460 A | * | 2/2000 | David et al. ................. | 710/129 |
| 6,097,698 A | * | 8/2000 | Yang et al. .................. | 370/231 |
| 6,173,378 B1 | * | 1/2001 | Rozario et al. .............. | 711/163 |
| 6,304,936 B1 | * | 10/2001 | Sherlock ...................... | 710/129 |

OTHER PUBLICATIONS

PCI Industrial Computers PICMG (tm). Compact PCI (tm) Specification Short Form. Revision 2.1. Sep. 2, 1997.

* cited by examiner

*Primary Examiner*—Wellington Chin
*Assistant Examiner*—Brenda Pham

(57) ABSTRACT

A method and apparatus for controlling the flow of data units across a bus bridge and an inter-bus communication system employing same is disclosed. In accordance with the method, the apparatus detects operational states of the bridge and disables load access to the bridge when a first predefined operational state exists and enables load access when a second predefined operational state exists.

30 Claims, 2 Drawing Sheets

FLOW CONTROL OF DATA UNITS ACROSS A BUS BRIDGE AND INTER-BUS COMMUNICATION SYSTEM EMPLOYING SAME

BACKGROUND OF THE INVENTION

1. Field of the Invention

This invention relates to communications between data buses and more particularly to control the flow of data units across a bus bridge and an inter-bus communications system employing same.

2. Description of Related Art

Data units are often required to be transmitted between separate buses in systems which have multiple buses or bus extensions.

An example of this occurs in a Compact PCI bus system where the Compact PCI bus is used as a medium to transfer Asynchronous Transfer Mode (ATM) cells between circuit cards in a chassis-based Compact PCI bus. This bus is limited to eight circuit cards per bus segment. PCI to PCI bridges are used to extend the number of circuit cards that can be supported in a single chassis.

In order to maximize the bandwidth of the Compact PCI bus, all circuit cards in the system transfer their outgoing ATM cells by performing a write burst of a 14 DWord ATM cell to a preprogrammed target address. Using writes to transfer data allows write posting across PCI to PCI bridges, which maximizes bandwidth utilization. If the target address is on a different bus segment than the initiator, the burst will be write posted into a buffer in the bridge. If an initiator is bursting an ATM cell across the bridge and the bridge buffer fills up, then the bridge will do a target disconnect even if the ATM cell has not been completely transferred. An arbiter in the bridge may grant the bus to the next initiator which will write a complete ATM cell over top of the partial ATM cell that is already in the buffer. The initiator that was disconnected will finish sending its ATM cell over top of the partial ATM cell that is already in the buffer, when it is next granted the bus. If all of the cells crossing the bridge were to the same target address, the cells would be corrupted when they arrive at the target because of the disconnect that happened while crossing the bridge.

Certain circuit cards in the system, such as modems and cell multiplexers, have a single FIFO target buffer. In order for these cards to operate properly, the 14 DWord burst must be written into the FIFO target buffer as complete cells and not as partial cells, ie., the ATM cells must arrive in their entirety and not be broken up.

Consequently, target disconnects must be prevented when data from multiple initiators intended for a single target crosses a PCI to PCI bridge to ensure that ATM cells arrive intact.

What would be desirable therefore is a way of controlling the flow of data units such as ATM cells across a bus bridge and a system which employs such flow control to avoid corrupted cells and loss of information. The present invention addresses this need.

SUMMARY OF THE INVENTION

The invention addresses the above problems by providing a method and apparatus for flow control of data units across a bus bridge and an inter-bus communication system employing same. Effectively, the invention provides for granting bridge access to requesting data transmitters to avoid data loss or corruption when transmitting data units such as asynchronous transfer mode (ATM) cells across the bridge, particularly where the bridge has a small input buffer.

In accordance with one aspect of the invention, there is provided a method of controlling the flow of data units across a bus bridge. The method includes detecting operational states of the bridge, disabling load access to the bridge when a first predefined operational state exists and enabling load access when a second predefined operational state exists.

In accordance with another aspect of the invention, there is provided an apparatus for controlling the flow of data units across a bus bridge. The apparatus includes a bridge monitor for monitoring operational states of the bridge and a control circuit. The control circuit disables load access to the bridge when the bridge moni tor detects a first predefined operational state and enables load access to the bridge when the bridge detects a second predefined operational state.

Preferably, the bridge monitor defines the first predefined operational state as when a predefined number of data units is stored in the bridge and defines the second predefined operational state as when fewer than the predefined number of data units and stored in the bridge. The number of data units may be monitored by incrementing a counter when a data unit is loaded to the bridge and decrementing the counter when a data unit is unloaded from the bridge. In one embodiment, the counter may be responsive to an ATM cell being loaded or unloaded from the bridge. In another embodiment, the counter may be incremented and decremented in response to a data word being loaded or unloaded from the bridge.

The apparatus has particular application in a Compact PCI bus architecture, and in such architecture, the bridge monitor preferably monitors C/BE# and FRAME# signals on a secondary Compact PCI bus and monitors DEVSEL#, C/BE#, TRDY#, STOP#, FRAME# and GNT# signals on a primary Compact PCI bus.

Through use of the flow control apparatus and a bridge in communication with at least two data buses, there is provided an inter-bus communication system according to the invention. The inter-bus communication system may be used in conjunction with at least two data buses in communication with the inter-bus communication system to produce a multiple bus system which allows communication between buses in a manner which avoids corruption of data. When used in a Compact PCI system, ATM cells are kept intact and disconnects are prevented from happening in the middle of a burst of an ATM cell to the bridge in the secondary to primary direction.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention.

DETAILED DESCRIPTION

Figure 1:
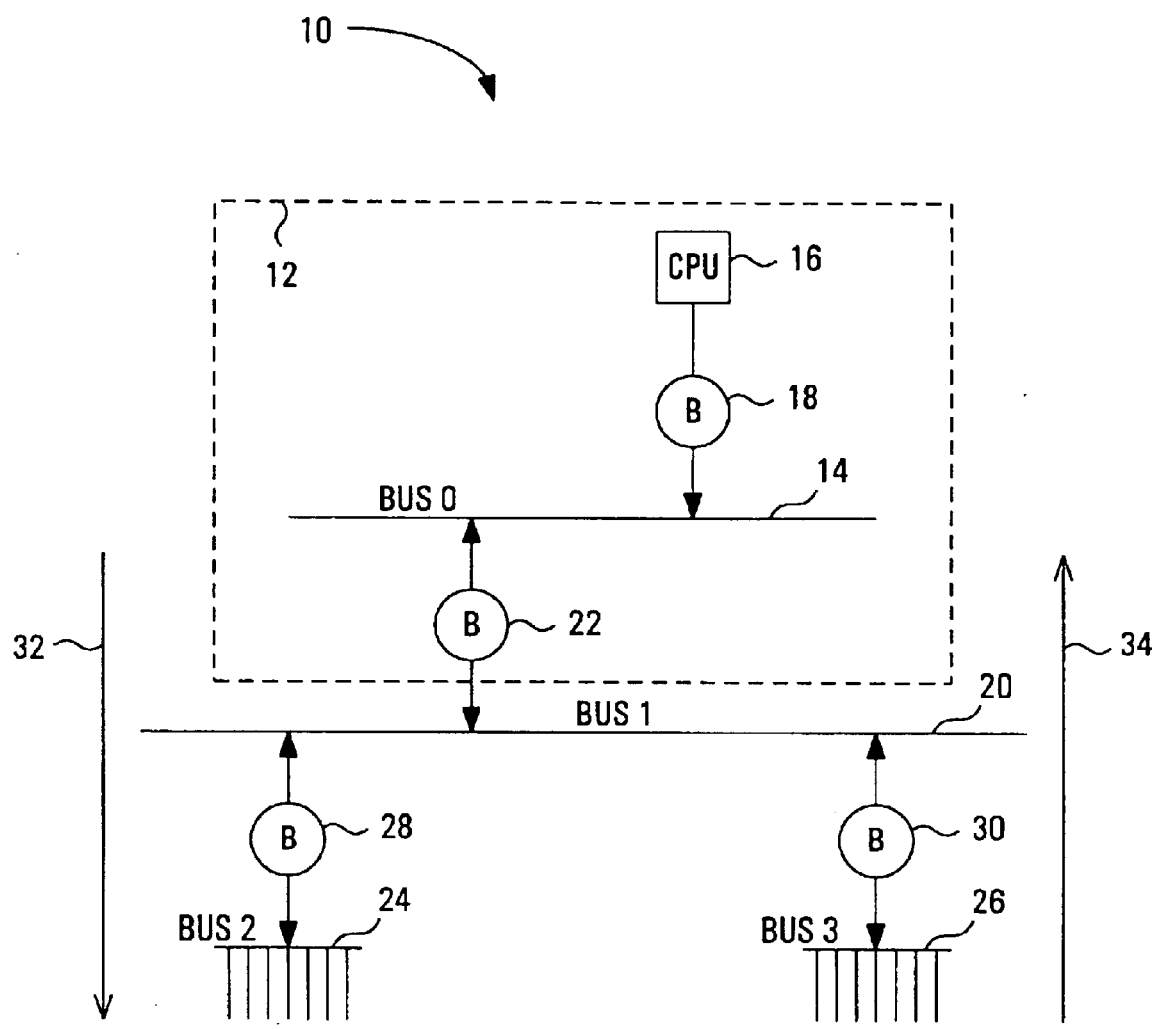
FIG. 1 is a schematic representation of a multiple bus system employing an inter-bus communication system and an apparatus for controlling the flow of data units across a bus bridge according to a first embodiment of the invention.

As shown in FIG. 1, an embodiment of an inter-bus communications, system in accordance with the present invention is designated generally by the reference character 10. As shown, the inter-bus communications system includes a computer system in accordance with the Compact peripheral component interconnect (PCI) specification available from the Compact PCI Industrial Computers Manufacturer Group, c/o Rogers Communications, 301 Edgewater Place, Suite 220, Wakefield, Mass. 01880. Such system includes a CPU card shown generally at 12 which has its own internal bus 14 to which a CPU 16 is connected by a host to PCI bridge 18. The internal bus 14 is connected to a first external Compact PCI bus 20 by a first PCI to PCI bridge 22.

The first external Compact PCI bus 20 is further connected to second and third external buses 24 and 26 by second and third PCI to PCI bridges 28 and 30 respectively.

Generally, communications on the buses from the internal bus 14 to the second and third buses 24 and 26 are considered to be communications in a downstream direction as indicated by arrow 32. Similarly, communications from the second and third buses 24 and 26 toward the internal bus 14 are considered to be upstream communications as indicated by arrow 34. Generally, a bus further upstream than a given bus is considered to be a primary bus while the given bus is considered to be a secondary bus.

In this embodiment in which the Compact PCI bus is used, target devices on the primary bus are designed so as to never produce a target disconnect in the middle of a cell transfer. Otherwise, cell fragmentation could occur due to events not controlled by the bridge.

FIG. 2

Figure 2:
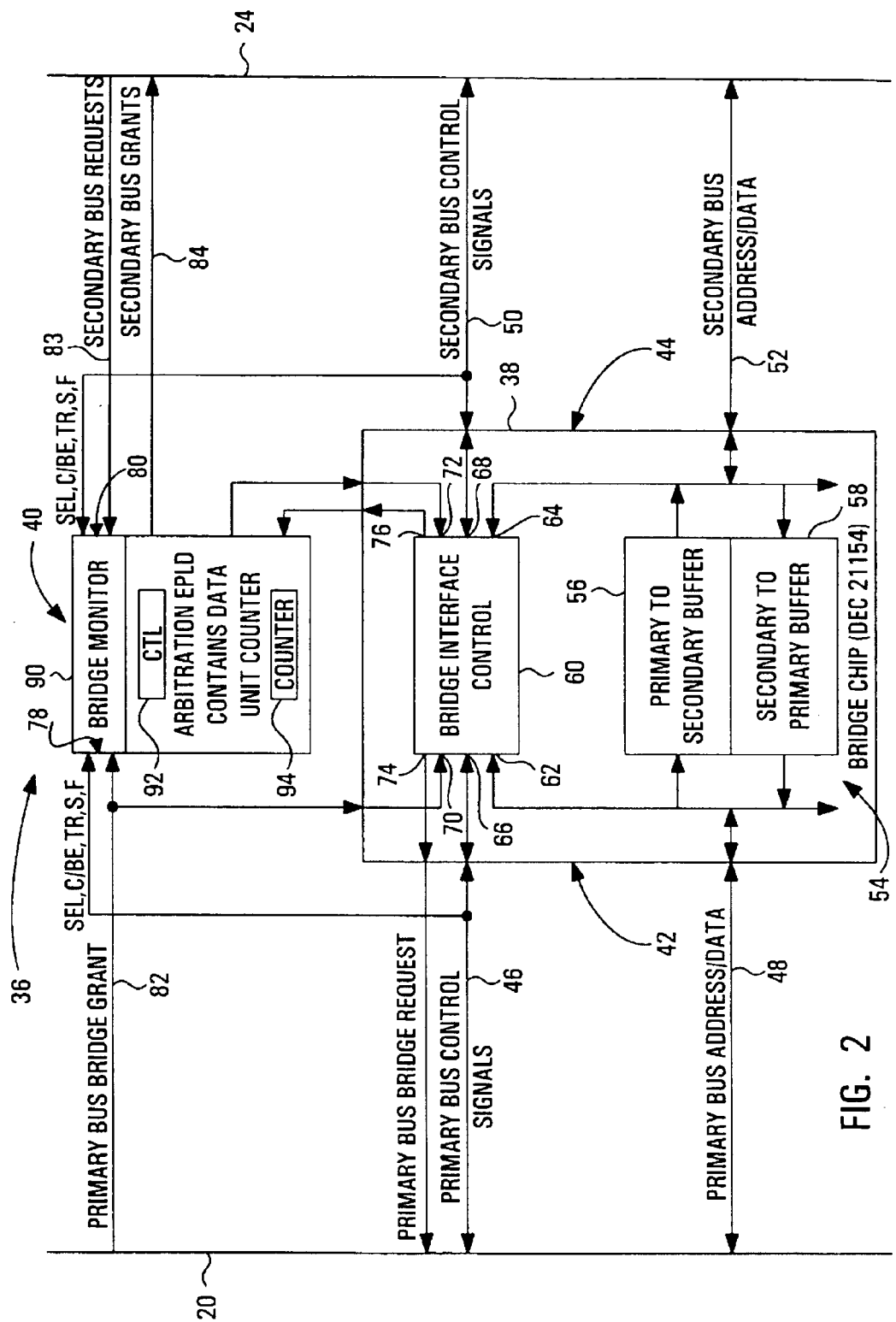
FIG. 2 is a schematic representation of the inter-bus communication system and apparatus for controlling the flow of data units across a bus bridge.

As shown in FIG. 2, a representative PCI to PCI bridge, representative of bridges 28 and 30 according to this embodiment of the invention, is designated generally by the reference character 36. The representative bridge includes a PCI to PCI bridge module 38 and an apparatus shown generally at 40 for controlling the flow of data units across the PCI to PCI bridge module 38.

The bridge module 38 includes a Digital Semiconductor 21154 PCI to PCI bridge chip packaged in a 304-point 2 LAYER PBGA package and has a primary bus interface shown generally at 42 and a secondary bus interface shown generally at 44. The primary bus interface 42 terminates signal lines from the primary bus, which in this embodiment, may be the first external Compact PCI bus 20, for example. The primary bus interface includes terminations for primary bus control signal lines shown generally at 46 and primary bus address/data signal lines 48. Similarly, the secondary bus interface 44 terminates signal lines from the secondary bus, which in this embodiment, may be the second bus 24, for example. The secondary bus interface 44 includes terminations for secondary bus control signal lines 50 and secondary bus address/data lines 52.

In this embodiment, the primary bus control signals and the secondary bus control signals include DEVSEL#, C/BE#, TRDY#, STOP#, FRAME# and GNT# signals as set forth in the Compact PCI specification.

The bridge module 38 further includes a set of buffers shown generally at 54 including a primary to secondary buffer 56 and a secondary to primary buffer 58 for buffering data to be transferred across the bridge. In this embodiment, the primary to secondary buffer 56 has a depth of 88 bytes whereas the secondary to primary buffer 58 has a depth of 152 bytes. This invention is mainly concerned with the flow of data from the secondary bus to the primary bus, in this case from the second Compact PCI bus 24 to the first external Compact PCI bus 20.

With the ability to store 152 bytes, the secondary to primary buffer 58 is capable of receiving and storing two full and one partial asynchronous transfer mode (ATM) cells from the secondary bus, in this case the second Compact PCI bus 24.

The bridge module 38 further includes a bridge interface control 60 which has primary and secondary data terminations 62 and 64, primary and secondary bus control terminations 66 and 68, primary and secondary bridge grant terminations 70 and 72 and primary and secondary bridge request terminations 74 and 76.

The bridge module 38 is connected to the data flow control apparatus 40. In this embodiment, the data flow control apparatus includes an Electrically Programmable Logic Device (EPLD). Alternatively, a Field Programmable Gate Array (FPGA) could be used. The EPLD is programmed to include primary and secondary bus interfaces shown generally at 78 and 80. The primary bus interface 78 provides terminations for receiving primary bus control signals on primary bus control signal lines 46 and primary bus bridge grant signals on primary bus bridge grant signal lines 82, both of which are provided by the primary bus, in this case the first external Compact PCI bus 20, in accordance with the Compact PCI specification.

The secondary bus interface 80 includes terminations for receiving secondary bus control signals a the secondary bus control signal lines 50, and secondary bus request signals on secondary bus request signal lines 83, from the secondary bus, in this case the second Compact PCI bus 24 in accordance with the Compact PCI specification.

The secondary bus interface 80 further has terminations for providing secondary bus grant signals on secondary bus grant signal lines 84 to the secondary bus, in this case the second Compact PCI bus 24 for controlling secondary bus access to the bridge module 38.

The EPLD is programmed to implement a bridge monitor 90, a control circuit 92 and a counter 94. The bridge monitor monitors primary and secondary bus control signals on the primary and secondary bus control signal lines 46 and 50 including the C/BE#, FRAME# and GNT# signals from the secondary bus, in this case, bus 24 and DEVSEL#, C/BE#, TRDY#, STOP#, FRAME# and GNT# signals from the primary bus, in this case, bus 20. Using these signals, the bridge monitor 90 monitors the operational states of the bridge.

In particular, the bridge monitor 90 is configured to define a first predefined operational state as when a predefined number of data units is stored in the secondary to primary buffer 58, and to define a second predefined operational state as when fewer than such predefined number of data units are stored in the secondary to primary buffer 58. The determination of the number of data units stored in the secondary to primary buffer 58 is provided by the counter 94 which is incremented by the bridge monitor 90 when a data unit is loaded into the secondary to primary buffer 58 and which is decremented by the bridge monitor 90 when a data unit is unloaded from the secondary to primary buffer 58. The bridge monitor 90 determines when a data unit is loaded or unloaded from the secondary to primary buffer 58 by the states of the monitored primary bus control signals and secondary bus control signals on primary bus control signal lines 46 and secondary bus control signal lines 50 respectively.

The determination of when a data unit is loaded into the bridge is determined as follows. The Bridge monitor 90 samples the FRAME# signal on the secondary bus to determine start of a transaction on the secondary bus. The CBE# signals are then latched and decoded. If these signals define a predefined value, in this case 0111b, the transaction is deemed to be a write transaction. The grant signal is then sampled and if it is deasserted a device on the secondary bus is deemed to be the initiator of the transaction. The counter is then incremented. In summary, the counter is incremented when a transaction is detected on the secondary bus and this transaction is a memory write as indicated by CBE, and the initiator of the transaction is a device, other than the bridge, on the secondary bus. (A transaction initiated by the bridge is indicated by an 1 active GNT# signal (secondary bus) for the bridge).

A data unit is deemed to be unloaded from the bridge and the counter is decremented when a transaction is detected on the primary bus (FRAME# active), and this transaction is a memory write as indicated by C/BE# on the primary bus, and the initiator of the transaction is the bridge as indicated by the bridge GNT# signal on the primary bus, and no target disconnects occurred during the transaction as indicated by TRDY#, DEVSEL# and STOP# signals on the primary side.

In this embodiment, because ATM cells are being transferred across the bridge through the secondary to primary buffer 58, the counter 94 acts as an ATM cell counter incremented and decremented in response to an ATM cell being loaded to the bridge or unloaded from the bridge respectively. Alternatively, however, the counter may be incremented and decremented in response to a data word being loaded to the bridge or unloaded from the bridge respectively. The detection of the transfer of the data word to increment or decrement the counter is preferable where the sizes of the data units varies.

The control circuit 92 is in communication with the bridge monitor 90 and functions to activate secondary bus grant signals on secondary bus grant signal lines 84 in response to the state of the bridge and more particularly in response to the fullness of the secondary to primary buffer 58. The control circuit 92 disables load access to the bridge module 38 when the bridge monitor 90 detects a first predefined operational state at the bridge module 38 and enables load access to the bridge module 38 when the bridge monitor 90 detects a second predefined operational state at the bridge module 38. In this embodiment, the first predefined operational state is when a predefined number of data units is stored in the secondary to primary buffer 58 and the second predefined operational state is when fewer than the predefined number of data units are stored in the secondary to primary buffer. In this embodiment, where the data units are ATM cells, the predefined number is 2. This is because the secondary to primary buffer 58 is only capable of holding 2 full ATM cells.

Effectively, therefore, by controlling the secondary bus grant signals, the control circuit 92 is operable to disable load access to the bridge module 38 when the counter 94 reaches the predefined number and continues to disable load access until a data unit is unloaded from the bridge module 38, or in other words, until the counter 94 is decremented.

In this embodiment, the control circuit 92 activates one of eight secondary bus grant signals on the secondary bus grant signal lines 84 to grant load access to one of the devices connected to the secondary bus, in this case the second Compact PCI bus 24. The control circuit 92 is configured to successively enable each of the devices connected to the secondary bus in a round robin fashion, when access to the bus is re-enabled after a data unit is unloaded from the bridge. This prevents any one device connected to the secondary bus from hoarding bridge bandwidth to the exclusion of other devices on the secondary bus.

Effectively, a target disconnect on the secondary bus is avoided by preventing any of the components on the secondary bus from being granted access to the bus when there is not enough room in the secondary to primary buffer 58 to receive a complete ATM cell. An indication of the available room in the secondary to primary buffer is provided by the counter 94 which is incremented when a component on the secondary bus starts a write transaction to the bridge module 38 in which a data unit is loaded into the secondary to primary buffer 58. The counter 94 is decremented when the bridge module 38 successfully completes a write transaction in which a data unit from the secondary to primary buffer 58 is written to a device on the primary bus or in other words, when a data unit is unloaded from the secondary to primary buffer 58.

The counter 94 is not decremented if the primary bus control signals indicate a target disconnect, as this indicates that the data unit was not completely sent. If the counter value is equal to the maximum number of data units that the secondary to primary buffer 58 holds then further access to the bridge module 38 is prevented and devices on the secondary bus cannot write date units to the secondary to primary buffer 58.

After the bridge successfully completes a write transaction on the primary bus, access is granted to the next component on the secondary bus in a round robin fashion. While the counter holds a value less than the predetermined value of 2 in this embodiment, each component connected to the secondary bus is granted access to the bridge module in turn by selectively activating the secondary bus grant signals. If a component to which access is granted does not require access to the bridge, the next component in the round robin scheme is granted access. This process continues until a component which requires access to the bridge module is granted such access in which case it is permitted to transfer data units to the bridge module.

While specific embodiments of the invention have been described and illustrated, such embodiments should be considered illustrative of the invention only and not as limiting the invention as construed in accordance with the accompanying claims.

What is claimed is:

1. A method of controlling the flow of data units across a bus bridge, comprising:
    a) detecting operational states of a bus bridge in communication with at least two data buses for transferring data between the at least two data buses;
    b) disabling load access to the bridge when a first predefined operational state exists at the bridge, wherein disabling includes signalling at least one device on at least one of the at least two data buses to indicate that load access to the bridge will not be granted; and
    c) enabling load access to the bridge when a second predefined operational state exists at the bridge.

2. A method as claimed in claim 1 wherein detecting operational states of the bridge includes detecting, as said first predefined operational state, the presence of a predefined number of data units stored in the bridge, and detecting, as said second predefined operational state, fewer than said predefined number of data units stored in the bridge.

3. A method as claimed in claim 1 wherein detecting operational states includes monitoring activity on each bus connected to the bridge.

4. A method as claimed in claim 3 wherein monitoring includes monitoring signals on each bus connected to the bridge.

5. A method as claimed in claim 4 wherein monitoring includes monitoring control signals on a primary Compact PCI bus and on a secondary Compact PCI bus.

6. A method as claimed in claim 2 further including incrementing a counter when a data unit is loaded to the bridge.

7. A method as claimed in claim 6 further including decrementing said counter when a data unit is unloaded from the bridge.

8. A method as claimed in claim 7 wherein incrementing and decrementing includes incrementing and decrementing respectively in response to an ATM cell as a data unit.

9. A method as claimed in claim 7 wherein incrementing and decrementing includes incrementing and decrementing respectively in response to a data word as a data unit.

10. A method as claimed in claim 7 wherein disabling includes disabling the load access to the bridge by components on at least one bus when said counter reaches said predefined number.

11. A method as claimed in claim 1 wherein disabling includes disabling access to the bridge until a data unit is unloaded from the bridge.

12. An apparatus for controlling the flow of data units across a bus bridge, comprising:
 a) means for monitoring operational states of a bus bridge in communication with at least two data buses for transferring data between the at least two data buses; and
 b) means for controlling equipment connected to at least one bus for disabling load access to the bridge by said equipment when said means for monitoring detects a first predefined operational state at the bridge and for enabling load access to the bridge when said means for monitoring detects a second predefined operational state at the bridge, wherein the means for controlling equipment for disabling load access includes means for signalling at least one device on at least one of the at least two data buses to indicate that load access to the bridge will not be granted.

13. An apparatus for controlling the flow of data units across a bus bridge, comprising:
 a) a bridge monitor for monitoring operational states of a bus bridge in communication with at least two data buses for transferring data between the at least two data buses; and
 b) a control circuit for disabling load access to the bridge when said bridge monitor detects a first predefined operational state at the bridge and for enabling load access to the bridge when said bridge monitor detects a second predefined operational state at the bridge, wherein said control circuit is operable to produce a signal to at least one device connected to the bridge to indicate that load access to the bridge is denied.

14. An apparatus as claimed in claim 13 wherein said bridge monitor defines said first predefined operational state as when a predefined number of data units is stored in the bridge and wherein said bridge monitor defines said second predefined operational state as when fewer than said predefined number of data units are stored in the bridge.

15. An apparatus as claimed in claim 13 wherein said bridge monitor defines said first predefined operational state as when a predefined number of data units is stored in the bridge and wherein said bridge monitor includes signal sensors for sensing at least some signals on each bus in communication with the bridge.

16. An apparatus as claimed in claim 13 wherein said bridge monitor is operable to monitor control signals on a primary Compact PCI bus in communication with the bridge and on a secondary Compact PCI bus in communication with the bridge.

17. An apparatus as claimed in claim 14 further including a counter incremented by the bridge monitor when a data unit is loaded to the bridge and decremented by the bridge monitor when a data unit is unloaded from the bridge.

18. An apparatus as claimed in claim 17 wherein said counter includes an ATM cell counter incremented and decremented in response to an ATM cell being loaded to the bridge or unloaded from the bridge respectively.

19. An apparatus as claimed in claim 17 wherein said counter includes a data unit counter incremented and decremented in response to a data unit being loaded to the bridge or unloaded from the bridge respectively.

20. An apparatus as claimed in claim 17 wherein said control circuit is operable to disable load access to the bridge when said counter reaches said predefined number.

21. An apparatus as claimed in claim 13 wherein said control circuit is operable to disable load access until a data unit is unloaded from the bridge.

22. An inter-bus communication system comprising the apparatus as claimed in claim 13 and further comprising the bus bridge.

23. A multiple bus system comprising the inter-bus communication system as claimed in claim 22 and further including the at least two data buses in communication with said inter-bus communication system.

24. A method of controlling the flow of data units across a bus bridge, comprising:
 detecting operational states of a bus bridge in communication with at least two data buses for transferring data between the at least two data buses, wherein detecting includes detecting, as a first predefined operational state, the presence of a predefined number of data units stored in the bridge, and detecting, as a second predefined operational state, fewer than said predefined number of data units stored in the bridge;
 disabling load access to the bridge when said first predefined operational state exists at the bridge;
 enabling load access to the bridge when said second predefined operational state exists at the bridge; and
 incrementing a counter when a data unit is loaded to the bridge, and decrementing said counter when a data unit is unloaded from the bridge, wherein incrementing and decrementing include incrementing and decrementing respectively in response to a data word as a data unit.

25. An apparatus for controlling the flow of data units across a bus bridge, comprising:
 a) a bridge monitor for monitoring operational states of a bus bridge in communication with at least two data buses for transferring data between the at least two data buses, wherein said bridge monitor defines a first predefined operational state as when a predefined number of data units is stored in the bridge and wherein said bridge monitor includes signal sensors for sensing at least some signals on each bus in communication with the bridge; and
 b) a control circuit for disabling load access to the bridge when said bridge monitor detects said first predefined operational state at the bridge and for enabling load access to the bridge when said bridge monitor detects a second predefined operational state at the bridge.

26. A method of controlling the flow of data units across a bus bridge, the method comprising:
 a) detecting operational states of the bridge including a first operational state in which the bridge has insufficient storage capacity to store a complete data unit, and a second operational state in which the bridge has sufficient storage capacity to store a complete data unit;

b) disabling load access to the bridge when the first predefined operational state exists at the bridge; and c) enabling load access to the bridge when the second predefined operational state exists at the bridge.

27. A method as claimed in claim 26 wherein detecting operational states of the bridge includes detecting as said first predefined operational state the presence of a predefined number of data units stored in the bridge and detecting as said second predefined operational state fewer than said predefined number of data units stored in the bridge.

28. An apparatus for controlling the flow of data units across a bus bridge, the apparatus comprising:

a) means for monitoring operational states of the bridge including a first operational state in which the bridge has insufficient storage capacity to store a complete data unit, and a second operational state in which the bridge has sufficient storage capacity to store a complete data unit; and b) means for controlling equipment connected to at least one bus for disabling load access to the bridge by said equipment when said means for monitoring detects the first predefined operational state at the bridge and for enabling load access to the bridge when said means for monitoring detects the second predefined operational state at the bridge.

29. An apparatus for controlling the flow of data units across a bus bridge, the apparatus comprising:

a) a bridge monitor for monitoring operational states of the bridge including a first operational state in which the bridge has insufficient storage capacity to store a complete data unit, and a second operational state in which the bridge has sufficient storage capacity to store a complete data unit; and b) a control circuit for disabling load access to the bridge when said bridge monitor detects the first predefined operational state at the bridge and for enabling load access to the bridge when said bridge monitor detects the second predefined operational state at the bridge.

30. An apparatus as claimed in claim 29 wherein said bridge monitor defines said first predefined operational state as when a predefined number of data units is stored in the bridge and wherein said bridge monitor defines said second predefined operational state as when fewer than said predefined number of data units are stored in the bridge.

* * * * *